United States Patent Office 2,789,124
Patented Apr. 16, 1957

2,789,124

ORGANIC PHOSPHATE COMPOUNDS AND METHOD OF PREPARATION AND USE THEREOF

Everett E. Gilbert, Flushing, and Julian A. Otto, Long Island City, N. Y., assignors to Allied Chemical & Dye Corporation, New York, N. Y., a corporation of New York No Drawing. Application July 2, 1951,
Serial No. 234,904

20 Claims. (Cl. 260—461)

This invention relates to the preparation of new compounds particularly useful as pesticides.

Accordingly, one object of the invention is to provide new chemical compounds in the form of esters of phosphoric and thiophosphoric acid. Another object is the provision of novel cyclic acetal phosphates and cyclic ketal phosphates, and particularly the corresponding thiophosphates, for application especially as pesticides. Yet another aim of the invention is to provide a process for the preparation of these compounds. Other objects and advantages of the invention will be apparent hereinafter.

In accordance with the above objects, the invention of this application is directed to compounds of the general formula $$(C_2H_5O)_2\overset{X}{\underset{\|}{P}}-OR$$

where R is a radical formed by removal of —OH from a heterocyclic alcohol containing as the only non-carbon atoms in the ring two oxygen atoms separated by a carbon atom, and X is oxygen or sulfur. The preferred compounds of the invention are those where X is sulfur. The heterocyclic alcohols may be unsubstituted or may carry organic and/or inorganic substituents, and the hydroxyl group may be attached to a ring carbon or to a carbon atom not in the ring. These alcohols preferably contain from 5 to 6 atoms in the ring and may also be termed cyclic acetal or ketal alcohols.

Hence, the compounds of the above general formula are diethoxy phosphoric or thiophosphoric acid esters of cyclic acetal and ketal alcohols. These compounds, particularly the thiophosphoric acid esters, have been found of considerable value as pesticides, especially with respect to their acaricidal, insecticidal and mothicidal activity. However, the invention compounds may also find use as lubricating oil additives and as pharmaceuticals.

For purposes of more clearly illustrating the invention and from a preferred standpoint, R in the above general formula may be one of the following radicals:

(a), (b), (c)

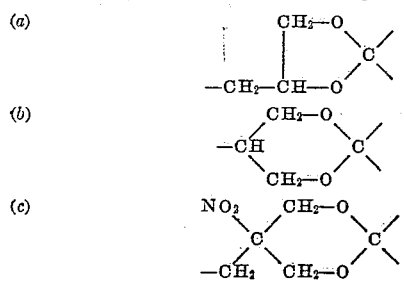

where the radical

adjoining the two oxygen atoms is formed by removal of =O from a ketaldone. The term "ketaldone" is intended to denote and include aldehydes and ketones. R₁ and R₂, representing the residue of such ketaldone and satisfying the other two valences of the carbon atom in the latter radical to give the group

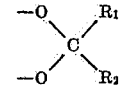

may be hydrogen, aliphatic, aromatic, aliphatic-aromatic or alicyclic radicals, R₁ and R₂ being the same or different, or R₁ and R₂, together with the mutually adjoining carbon atom, may constitute an alicyclic radical of the formula

Several typical compounds of the invention are noted below:

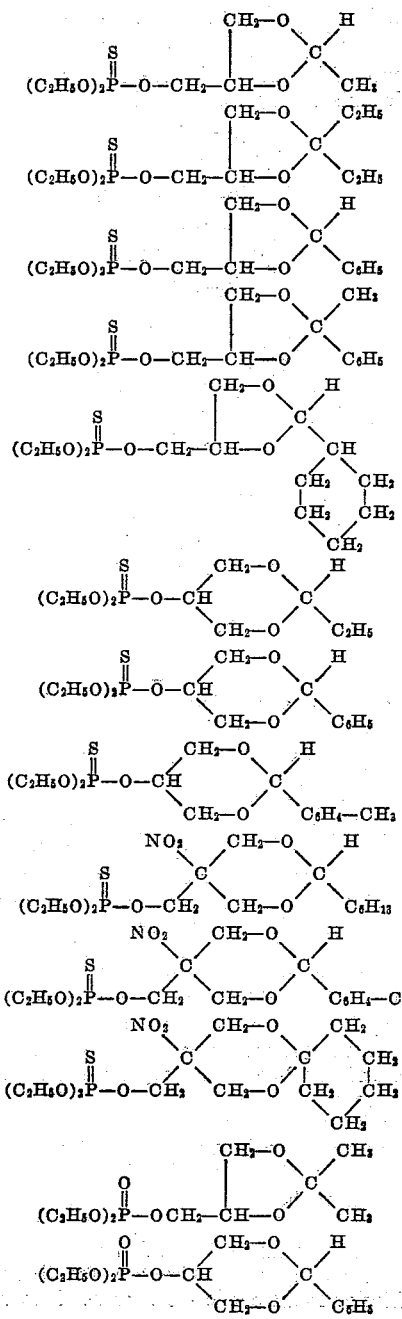

(14) 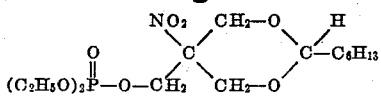

In addition to the compounds set forth immediately above, other compounds within the scope of the invention are those in which $R_1$ and $R_2$ in the radical

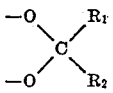

may be, for example, isopropyl, n-butyl, t-butyl, n-amyl, n-hexyl, 2,4-dichlorophenyl, piperonyl, cinnamyl, cyclopentyl, and the like.

The compounds of the invention are prepared by reacting diethoxy phosphoryl or thiophosphoryl chloride of the formula

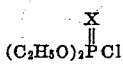

where X is oxygen or sulfur, with a heterocyclic alcohol as defined above, i. e. containing as the only non-carbon atoms in the ring two oxygen atoms separated by a carbon atom, in the presence of an acid binder. In the preferred embodiment of the invention, the phosphoryl chloride compound is reacted with one or more of the heterocyclic alcohols having the formula (d) 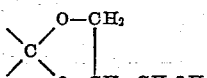

(e) 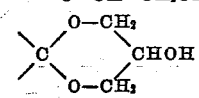

or (f) 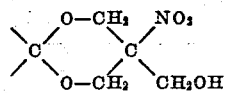

where the radical

adjoining the two oxygen atoms is formed by removal of =O from a ketaldone. $R_1$ and $R_2$, representing the residue of such ketaldone and satisfying the other two valences of the carbon atom in the above radical to give the group

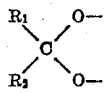

may have the values previously noted. Compound (d) is a 4-hydroxymethyl-1,3-dioxolane, compound (e) is a 5-m-dioxanol and compound (f) is a 5-(hydroxymethyl-nitro)-1,3 dioxane.

Approximately equimolar proportions of the phosphoryl chloride compound and the cyclic acetal or ketal alcohol are employed. However, if desired, smaller or larger quantities of either of the reactants may be utilized. Ordinarily, about one mol of acid binder per mol of the phosphoryl chloride is added to the reaction mixture, although varying quantities of binder may conveniently be employed. Organic and inorganic bases may be utilized as acid binder, organic bases being preferred. Typical organic bases suitable for use in the invention include pyridine, dimethyl aniline, quinoline, isoquinoline and the like, and inorganic bases which may be employed are, for example, sodium hydroxide and sodium carbonate. Organic solvents such as benzene and toluene may also be used to facilitate the reaction. The first portion of the reaction is usually maintained at a temperature below normal, i. e. below about 15° C., by cooling. Maintenance of these temperatures may be facilitated by controlled addition of one reactant to the other, e. g. by gradual addition of the diethoxy phosphoryl chloride to the cyclic acetal or ketal alcohol. The last portion of the reaction period, usually following addition of the reactants, is carried out at about room temperature (about 20° C.).

Following the reaction, water is generally added to the mass to dissolve the hydrochloric acid salt of the organic base material formed. The organic layer containing the cyclic acetal or ketal phosphate product, is then separated from the aqueous salt-containing layer, and the organic layer, after washing, may be distilled to remove any organic solvent or other contaminants present, leaving the cyclic acetal or ketal phosphate as product.

The cyclic acetal and ketal alcohols employed for reaction with the diethoxy phosphoryl or thiophosphoryl chloride in accordance with the invention, may be prepared in any suitable manner. However, these compounds may be conveniently obtained by reacting glycerol or trimethylol nitromethane with the desired corresponding aldehyde or ketone. The reaction of these ketaldones with glycerol is described in the article "Drugs Effecting Muscular Paralysis. Some Substituted Dioxolanes and Related Compounds," by V. Boekelheide et al., Jour. Am. Chem. Soc., vol. 71, pages 3303–3307 (1949), and the reaction of an aldehyde or ketone with trimethylol nitromethane, alternatively designated tris-(hydroxymethyl) nitromethane, is disclosed in U. S. Patents 2,297,921 and 2,368,071 to Senkus. In carrying out these reactions the appropriate ketaldone is heated with glycerol or trimethylol nitromethane in the presence of a small amount of an acid catalyst, e. g. hydrochloric, sulfuric or toluenesulfonic acid. Generally, an organic liquid such as benzene or toluene is added to the reaction mixture to remove the water formed by the condensation reaction, as a constant boiling or azeotropic mixture.

Suitable aldehydes which may be employed for condensation with glycerol or trimethylol nitromethane in the above described reaction include, for example, formaldehyde, acetaldehyde, propionaldehyde, ethyl butyraldehyde, ethyl hexaldehyde, heptaldehyde, benzaldehyde, p-toluic aldehyde, 4-chlorobenzaldehyde, 2,4-dichlorobenzaldehyde, 4-nitrobenzaldehyde, anisaldehyde, piperonal, cinnamic aldehyde, n-amyl cinnamic aldehyde, hexahydro benzaldehyde, and the like. Illustrative of ketones which may be employed for reaction with glycerol or trimethylol nitromethane are acetone, methyl ethyl, methyl isobutyl, methyl t-butyl, methyl n-amyl, methyl n-heptyl, diethyl, ethyl n-butyl, diisopropyl and diisobutyl ketone, acetophenone, 4-chloroacetophenone, propiophenone, cyclopentanone and cyclohexanone.

When an aldehyde is reacted with glycerol in the manner noted above, a mixture of the above dioxolane and dioxanol compounds (d) and (e) is obtained, with the former usually predominating depending upon the particular aldehyde employed. On the other hand, when a ketone is used for reaction with glycerol, substantially only the dioxolane compound (d) is formed. Hence, when preparing cyclic acetal phosphates in accordance with the invention by first condensing an aldehyde with glycerol, a mixture of two cyclic acetal alcohols is first formed, and on reaction of this mixture with the diethoxy phosphoryl chloride compound, the ultimate product obtained constitutes a mixture of two cyclic acetal phosphates, one of which contains the dioxolane radical (a) corresponding to R in the above general formula and the other contains the dioxanol radical (b) corresponding to R in the general formula. However, when employing a ketone as initial starting material for reaction with glycerol in the foregoing series of reactions, the final product usually consists of a single cyclic ketal phosphate compound containing the dioxolane radical (a) corresponding to R of the general formula.

The following are examples of the preparation of the cyclic acetal and ketal phosphate compounds of the invention, all quantities being expressed in parts by weight:

*Example 1.*—92 parts glycerol and 128 parts 2-ethylhexaldehyde were added to 200 parts toluene and 5 parts toluenesulfonic acid, the latter two compounds serving as solvent and catalyst respectively. The solution was heated to reflux with mechanical agitation, and the water removed azeotropically with toluene as it formed, about 17 parts water being collected during a 9 hour period. The reaction mixture was cooled to 10° C. and 80 parts pyridine were added, followed by the gradual addition of 189 parts diethoxy thiophosphoryl chloride while keeping the temperature of the solution below 10° C. The temperature was maintained at this level for 5 hours, and the solution was thereafter allowed to stand at room temperature for 72 hours. Water was then added to dissolve pyridine hydrochloride and the toluene product-containing layer was separated from the aqueous layer and washed several more times with water. The resulting toluene solution was then vacuum distilled to remove the toluene and any unreacted materials, leaving as product 360 parts of a red liquid consisting essentially of a mixture of compounds of the formulae

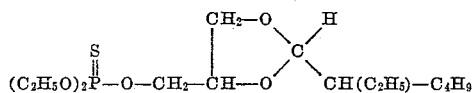

and

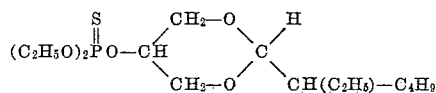

*Example 2.*—150 parts methyl isobutyl ketone, 138 parts glycerol and 4 parts toluenesulfonic acid were added to 200 parts toluene. The solution was heated and refluxed with mechanical stirring and the water azeotropically distilled out as it formed, about 26 parts being collected during a 15 hour period. The reaction mixture was cooled to 7° C. and 120 parts pyridine added, followed by the addition of 285 parts diethoxy thiophosphoryl chloride at a temperature below 10° C. The solution was maintained at this temperature for approximately 7 hours and then at room temperature for 24 hours. After this reaction period, the solution was added to water to extract pyridine hydrochloride and the toluene layer was separated from the resulting aqueous layer and washed several more times with water. The toluene solution was then distilled under vacuum to remove toluene solvent and any unreacted material. About 450 parts of a yellow liquid constituting the cyclic ketal thiophosphate product and consisting essentially of the compound having the formula

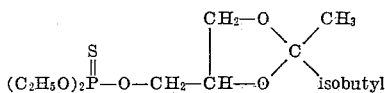

were obtained as residue.

*Example 3.*—About 138 parts glycerol, 213 parts diisobutyl ketone and 5 parts toluenesulfonic acid were added to 200 parts toluene. The solution was heated and refluxed with agitation until the required amount of water was removed, 25 parts being collected during a 35 hour period. The reaction mixture was cooled to 5° C. and 120 parts pyridine added, followed by the slow addition of 285 parts diethoxy thiophosphoryl chloride. The temperature was kept below 15° C. during the addition of the phosphoryl chloride and for 6 hours thereafter. The reaction mixture was then maintained at room temperature for 48 hours and added to water to extract pyridine hydrochloride. After removal of the aqueous layer, the organic layer was washed several times with water and then distilled to remove the toluene and any unreacted materials. 363 parts of a brown liquid cyclic ketal thiophosphate product were recovered.

*Example 4.*—A mixture of 57 parts n-heptaldehyde, 75 parts trimethylol nitromethane, 0.1 part p-toluenesulfonic acid and about 88 parts benzene were heated at reflux temperature with agitation, the water formed during the reaction being removed by means of azeotropic distillation. After water ceased to be formed, the mixture was cooled and washed with about 100 parts 2% sodium bicarbonate solution and 250 parts water. After drying over anhydrous sodium sulfate the benzene was removed by distillation to give a residue of 93 parts of a brown viscous liquid constituting the cyclic acetal alcohol intermediate. Of this material, about 6 parts were dissolved in 16 parts pyridine and the mixture slowly added to a cooled solution of about 5 parts diethoxy thiophosphoryl chloride in 22 parts benzene. The mixture was allowed to stand at ice temperature for several hours and then for about 24 hours at room temperature. After washing with dilute hydrochloric acid and water, the oil layer was separated and dried over sodium sulfate, and the benzene removed from the oil by distillation at reduced pressure. About 10 parts of brown liquid cyclic acetal thiophosphate product consisting essentially of a compound of the formula

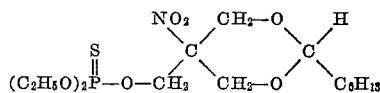

were obtained.

*Example 5.*—Using the procedure described in Example 4, 70 parts p-chlorobenzaldehyde and 75 parts trimethylol nitromethane yielded 108 parts of cyclic acetal alcohol in the form of a solid of melting point 137–143° C. On reacting about 7 parts of this material with about 5 parts diethoxy thiophosphoryl chloride, about 10 parts of a viscous liquid cyclic acetal thiophosphate were obtained.

*Example 6.*—In a procedure similar to that used in Example 4, 49 parts cyclohexanone and 75 parts trimethylol nitromethane gave 74 parts of a solid cyclic ketal alcohol of melting point 72–85° C. with about 5 parts diethoxy thiophosphoryl chloride, about 6 parts of this cyclic alcohol reacted to form 8 parts of a viscous liquid cyclic ketal thiophosphate product.

*Example 7.*—A mixture of about 42 parts benzaldehyde, 46 parts glycerol, 1 part p-toluenesulfonic acid and 172 parts toluene was heated with stirring while providing for continuous removal of water by azeotropic distillation with toluene. When no further formation of water occurred, the reaction mixture was cooled and washed successively with about 50 parts of 5% potassium carbonate solution and three 100-part portions of water. The toluene was removed under reduced pressure after the solution had been dried over anhydrous CaSO₄, to yield 45 parts of viscous oily cyclic acetal alcohol residue. About 9 parts of this residue were reacted with about 10 parts diethoxy thiophosphoryl chloride in the presence of 32 parts pyridine in accordance with the procedure given in Example 4, yielding 14 parts of cyclic acetal thiophosphate product.

*Example 8.*—In accordance with the procedure of Example 7, 48 parts acetophenone were reacted with 46 parts glycerol to yield 62 parts of cyclic ketal alcohol condensation product. About 10 parts of this material were then reacted with approximately 10 parts diethoxy thiophosphoryl chloride, producing about 15 parts of cyclic ketal thiophosphate product.

Cyclic acetal and ketal orthophosphates of the formula

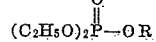

R having the values previously noted, may be prepared in a manner similar to that employed in Examples 1 to 8 using diethoxy phosphoryl chloride, $(C_2H_5O)_2POCl$, instead of the thiophosphoryl chloride.

The preferred products of the invention are those produced in Examples 1, 2, 3, 4 and 6.

The novel compounds of the invention are of particular value as insecticides, acaricides (miticides) and mothicides. These compounds are ordinarily applied as toxicants for combatting insects and mites, in conjunction with a carrier which may be a solid, liquid or gaseous material, the invention compounds constituting the essential active toxic ingredients of such compositions. For this purpose, the cyclic acetal and ketal phosphate compounds hereof may be employed either in the form of aqueous sprays or so-called dust compositions, and the amount of toxicant used may vary, a sufficient quantity being utilized to provide the desired toxicity.

When employed in the form of a powder or dust for killing insects and mites, the above compounds or toxicants may be mixed with a substantial proportion of any suitable inert material or diluent, preferably in finely divided form, such as known grades of prepared parasiticide carrier clays, pyrophyllite, fuller's earth, bentonite, sulfur, lime, talc, whiting, diatomaecous earth, etc. Suitable dusts of this type may consist, for example, of from 5% to 50% toxicant and from about 95% to 50% clay or diluent.

Liquid insecticide or miticide sprays containing the toxicants of the invention may be prepared by first forming a solution of the compound in a suitable organic solvent, e. g. xylene, methylated naphthalenes or any highly aromatic petroleum type insecticide oil, and preferably adding a small amount of wetting or emulsifying agent commonly employed in the art, such as diglycol oleate or the p-isooctyl phenyl ether of polyethylene glycol. The resulting concentrate solution is incorporated with water in quantity sufficient to form an aqueous spray dispersion or emulsion having the desired active ingredient concentration.

Representative sprays of this type may be prepared, for example, by first forming a solution of about 30% to 50% toxicant in about 67% to 47% organic solvent and adding approximately 3% wetting and dispersing agents, and then adding the resulting solution to water. In a preferred embodiment, aqueous spray dispersions or suspensions may be formed by incorporating in water dry mixtures or so-called wettable spray powders including the phosphate or thiophosphate products of the invention. These mixtures may contain say 10% to 60% by weight of active ingredient, the balance comprising inert diluents, suitable quantities of wetting and/or conditioning agents, and, if desired, compatible parasiticides. The aqueous spray dispersions of the invention preferably should contain the active ingredient individually or in admixture in amount not less than about 1/16 pound per 100 gallons, the more usual concentrations being in the range of 1/8 to 2 pounds per 100 gallons of dispersion, although in some instances higher toxicant concentrations may be employed.

The cyclic acetal and ketal phosphate compounds of the invention are generally applied as mothicides in the form of a dilute solution of the compound in an organic solvent, e. g. acetone, xylene or deodorized kerosene. Such solutions may contain from 0.1% to 10% of the invention compounds as active toxic ingredient. The material to be treated for protection from moths may be either sprayed with, or soaked in, solutions of this type. While the invention compounds and the immediately foregoing solutions thereof are herein termed "mothicides" in accordance with common trade usage, it is to be understood that such compounds and solutions act to destroy the larva from which the moth is produced, rather than the moth itself.

The table below shows the results of tests relating to the use of a number of typical cyclic acetal and ketal thiophosphate compounds of the invention as insecticides, acaricides and mothicides. With respect to the tests in the table showing insecticidal activity against the Mexican bean beetle, and acaricidal activity against the two-spotted mite of the compounds of the invention, the toxicants tested were formulated into a wettable spray powder by grinding and mixing 15% of the toxicant with 85% attapulgite clay. The powder was then suspended in water in amounts corresponding to 0.075, 0.15, 0.30 and 0.60 pound per 100 gallons, and the resulting dispersion applied in the form of a spray to infested plants. Insecticidal tests against the two-spotted mite were carried out at concentrations of 0.075 and 0.15 pound toxicant per 100 gallons of dispersion, and against the Mexican bean beetle at concentrations of 0.15, 0.30 and 0.60 pound toxicant per 100 gallons dispersion. In tests for the use of the compounds listed in the table below as mothicides against carpet beetle larvae, weighed woolen tests swatches were soaked in a 1% acetone solution of the respective compounds followed by air drying of the swatches to constant weight and exposure of each swatch to 10 carpet beetle larvae in a petri dish for a 28 day test period.

The invention compounds tested for pesticidal action as shown in the table below, were prepared by reacting an aldehyde or ketone with glycerol or trimethylol nitromethane to form the corresponding cyclic acetal or ketal alcohols, followed by reaction of these alcohols, in accordance with the principles of the invention, with diethoxy thiophosphoryl chloride to produce the cyclic acetal or ketal thiophosphate invention products. These products are conveniently designated in the table in terms of the particular aldehyde or ketone employed as starting material. In the case of those products set forth in the table as having been prepared from the reaction between aldehydes, e. g. ethyl hexaldehyde, and glycerol, it is understood, in accordance with the above, that the final product generally constitutes a mixture of cyclic acetal thiophosphates rather than a single cyclic acetal thiophosphate.

Table

A. PRODUCTS FORMED THRU INITIAL REACTION OF ALDEHYDES AND KETONES WITH GLYCEROL

| Aldehyde or Ketone used | Two-Spotted Mite: Percent Kill | | Mexican Bean Beetle | | Carpet Beetle Larvae, Percent Kill |
|---|---|---|---|---|---|
| | 0.075 lb. per 100 gal. spray | 0.15 lb. per 100 gal. spray | lbs. per 100 gal. spray | Percent Kill | |
| Aldehydes: | | | | | |
| Ethyl butyraldehyde | 23 | 47 | | | 100 |
| Ethyl hexaldehyde | 87 | 87 | 0.15 | 80 | 100 |
| Heptaldehyde | 88 | 91 | 0.30 | 90 | 100 |
| Benzaldehyde | 58 | 63 | 0.30 | 100 | 99 |
| p-Toluic aldehyde | 79 | 95 | 0.30 | 90 | 100 |
| 4-Chlorobenzaldehyde | | 85 | | | 100 |
| 2,4-Dichlorobenzaldehyde | 56 | 96 | 0.30 | 70 | 100 |
| 3,4-Dichlorobenzaldehyde | 71 | 95 | | | 97 |
| 4-Nitrobenzaldehyde | | | | | 100 |
| Anisaldehyde | 72 | 99 | | | 100 |
| Piperonal | 63 | 87 | | | 100 |
| Cinnamic aldehyde | 72 | 99 | 0.30 | 60 | 100 |
| n-Amyl cinnamic aldehyde | 49 | 84 | | | 98 |
| Ketones: | | | | | |
| S-Dichloroacetone | 68 | | 0.30 | 100 | 100 |
| Methyl ethyl | 72 | 96 | 0.30 | 70 | 100 |
| Methyl isobutyl | 89 | 98 | 0.30 | 100 | 100 |
| Methyl t-butyl | 99 | 90 | 0.30 | 90 | 100 |
| Methyl n-amyl | | | | | 100 |
| Methyl n-hexyl | | 78 | | | 100 |
| Methyl n-heptyl | 39 | 79 | 0.15 | 100 | 100 |
| Diethyl | 58 | 93 | | | 100 |
| Ethyl n-butyl | 29 | 90 | 0.15 | 100 | 100 |
| Diisopropyl | 74 | 83 | | | 100 |
| Diisobutyl | 57 | 90 | 0.15 | 90 | 100 |
| Acetophenone | | 38 | | | 100 |
| 4-Chloroacetophenone | | | | | 100 |
| 2,5-Dichloroacetophenone | | 30 | | | 100 |
| Propiophenone | | | | | 100 |
| 4-Chloropropiophenone | | | | | 95 |
| Cyclohexanone | | | | | 100 |

B. PRODUCTS FORMED THRU THE INITIAL REACTION OF ALDEHYDES AND KETONES WITH TRIMETHYLOL NITROMETHANE

| Ketaldones: | | | | | |
|---|---|---|---|---|---|
| 4-Chlorobenzaldehyde | 95 | | 0.60 | 100 | 80 |
| Cyclohexanone | 99 | | 0.60 | 100 | 80 |
| n-Heptaldehyde | 100 | | 0.60 | 87 | 100 |

From the foregoing, it is apparent we have discovered a series of new and valuable compounds possessing outstanding potency as insecticides, acaricides and mothicides.

Since various changes and modifications may be made in the invention without departing from the spirit thereof, the invention is to be taken as limited only by the scope of the appended claims.

We claim:

1. Compounds having formulas selected from the group consisting of

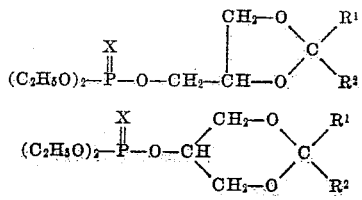

and

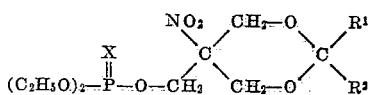

wherein $R^1$ and $R^2$ are radicals selected from the group consisting of hydrogen, lower alkyl, chloro-lower alkyl, phenyl, mono- and di-chlorophenyl, lower alkylphenyl, lower alkoxy phenyl, nitrophenyl, lower alkenyl phenyl, methylene dioxyphenyl radicals, and in which $R^1$ and $R^2$, together with the mutually adjoining carbon atom may constitute an alicyclic radical, and X is a member of the group consisting of oxygen and sulfur.

2. The compounds of claim 1 wherein X is sulfur.

3. A mixture of the cyclic acetal thiophosphates

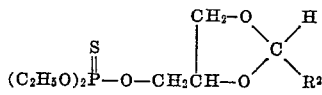

and

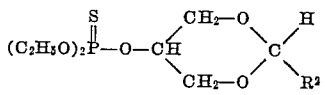

wherein $R^2$ is a radical selected from the group consisting of hydrogen, lower alkyl, chloro-lower alkyl, phenyl, mono- and di-chlorophenyl, lower alkylphenyl, lower alkoxy phenyl, nitrophenyl, lower alkenyl phenyl, and methylene dioxyphenyl radicals.

4. The mixture defined in claim 3 wherein $R^2$ is a lower alkyl radical.

5. The mixture defined in claim 3 wherein $R^2$ is the radical —$CH(C_2H_5)C_4H_9$.

6. The methyl isobutyl dioxolane diethoxy-thiophosphoric acid ester having the formula

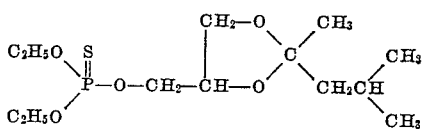

7. The diisobutyl dioxolane diethoxy-thiophosphoric acid ester having the formula

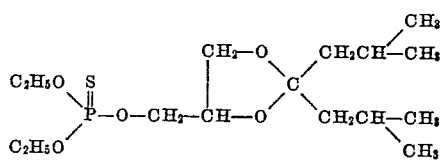

8. The hexyl nitrodioxane diethoxy-thiophosphoric acid ester having the formula

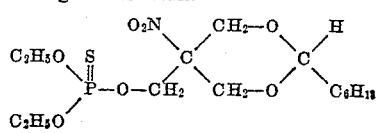

9. The cyclohexyl nitrodioxane diethoxy-thiophosphoric acid ester having the formula

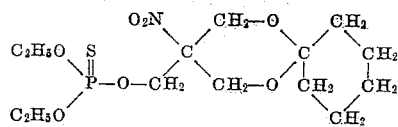

10. The process which comprises esterifying in the presence of an acid binder a phosphoryl chloride compound of the formula

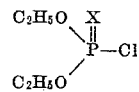

wherein X is a member of the group consisting of oxygen and sulfur, with a heterocyclic alcohol selected from the group having the following formulas

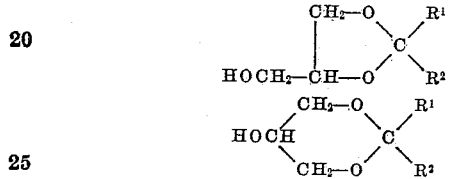

and

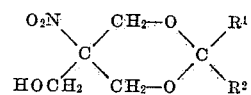

wherein $R^1$ and $R^2$ are radicals selected from the group consisting of hydrogen, lower alkyl, chloro-lower alkyl, phenyl, mono- and di-chlorophenyl, lower alkylphenyl, lower alkoxy phenyl, nitrophenyl, lower alkenyl phenyl, methylene dioxyphenyl radicals, and in which $R^1$ and $R^2$, together with the mutually adjoining carbon atom, may constitute an alicyclic radical.

11. The process of claim 10 wherein the phosphoryl ester is diethoxy-thiophosphoryl chloride, and wherein the acid binder is an organic base.

12. A pesticide composition containing as active toxic ingredient, at least one of the compounds defined in claim 1.

13. An insecticide and acaricide composition comprising a dilute aqueous dispersion of at least one of the compounds defined in claim 2.

14. An insecticide and acaricide composition comprising a dilute aqueous dispersion of at least one of the compounds having the formula

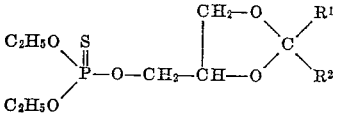

wherein $R^1$ and $R^2$ are radicals selected from the group consisting of hydrogen, lower alkyl, chloro-lower alkyl, phenyl, mono- and di-chlorophenyl, lower alkylphenyl, lower alkoxy phenyl, nitrophenyl, lower alkenyl phenyl, methylene dioxyphenyl radicals, and in which $R^1$ and $R^2$, together with the mutually adjoining carbon atom, may constitute an alicyclic radical.

15. An insecticide and acaricide composition comprising a dilute aqueous dispersion of at least one of the compounds having the formula

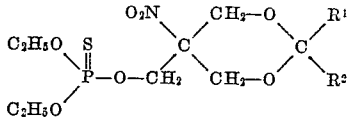

wherein $R^1$ and $R^2$ are radicals selected from the group consisting of hydrogen, lower alkyl, chloro-lower alkyl, phenyl, mono- and di-chlorophenyl, lower alkylphenyl, lower alkoxy phenyl, nitrophenyl, lower alkenyl phenyl, methylene dioxyphenyl radicals, and in which $R^1$ and $R^2$, together with the mutually adjoining carbon atom, may constitute an alicyclic radical.

16. An insecticide and acaricide spray composition comprising a dilute aqueous dispersion of a wettable powder containing at least one of the products defined in claim 2.

17. A mothicide composition comprising a dilute solution in an organic solvent of at least one of the compounds defined in claim 2.

18. A mothicide composition comprising a dilute solution in organic solvent of at least one of the compounds having the formula

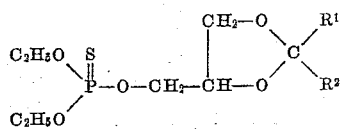

wherein $R^1$ and $R^2$ are radicals selected from the group consisting of hydrogen, lower alkyl, chloro-lower alkyl, phenyl, mono- and di-chlorophenyl, lower alkylphenyl, lower alkoxy phenyl, nitrophenyl, lower alkenyl phenyl, methylene dioxyphenyl radicals, and in which $R^1$ and $R^2$, together with the mutually adjoining carbon atom may constitute an alicyclic radical.

19. The method of combatting pests including insects, mites and moths, which comprises treating material subject to attack by said pests, with a composition containing at least one of the compounds defined in claim 2.

20. The method of combatting pests including insects, mites and moths, which comprises treating material subject to attack by said pests, with a composition containing at least one of the compounds of the formula

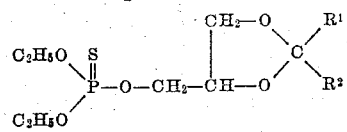

wherein $R^1$ and $R^2$ are radicals selected from the group consisting of hydrogen, lower alkyl, chloro-lower alkyl, phenyl, mono- and di-chlorophenyl, lower alkylphenyl, lower alkoxy phenyl, nitrophenyl, lower alkenyl phenyl, methylene dioxyphenyl radicals, and in which $R^1$ and $R^2$, together with the mutually adjoining carbon atom may constitute an alicyclic radical, as the active toxic ingredient.

References Cited in the file of this patent

UNITED STATES PATENTS

| | | |
|---|---|---|
| 2,565,920 | Hook et al. | Aug. 28, 1951 |
| 2,565,921 | Hook et al. | Aug. 28, 1951 |
| 2,583,744 | Schrader | Jan. 29, 1952 |

OTHER REFERENCES

Frear: Chem. of Insect. Fung. and Herb. 2nd edition, 1948, page 102. Copy in Division 43.

Boekelheide et al.: Jour. Am. Chem. Soc. 71, pages 3303–7 (1949).

Viscontini: Helv. Chem. Acta. 33, pages 594–5 (1950).